United States Patent
Inokuchi et al.

(10) Patent No.: US 7,039,848 B2
(45) Date of Patent: May 2, 2006

(54) DATA RECORDING MEDIUM, DATA RECORDING METHOD AND APPARATUS, DATA PLAYBACK METHOD AND APPARATUS, AND DATA DETERMINATION METHOD

(75) Inventors: Tatsuya Inokuchi, Tokyo (JP); Yoichiro Sako, Tokyo (JP); Shunsuke Furukawa, Tokyo (JP); Takashi Kihara, Chiba (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 10/319,679

(22) Filed: Dec. 16, 2002

(65) Prior Publication Data

US 2003/0172341 A1    Sep. 11, 2003

(30) Foreign Application Priority Data

Dec. 21, 2001  (JP) .............................. 2001-389753
Jan. 30, 2002  (JP) .............................. 2002-021189

(51) Int. Cl.
*G11C 29/00* (2006.01)
*H03M 13/00* (2006.01)

(52) U.S. Cl. ................... 714/769; 369/59.23; 380/201; 705/57; 711/163; 714/756; 726/26; 726/27; 726/31; 726/32; 726/33

(58) Field of Classification Search ........ 713/200–202; 714/756, 769; 711/163; 705/57; 380/201; 369/59.23; G11C 29/00; H03M 13/00
See application file for complete search history.

(56) References Cited

U.S. PATENT DOCUMENTS

| | | | | |
|---|---|---|---|---|
| 2,552,629 | A | * | 5/1951 | Hamming et al. .......... 714/777 |
| 5,418,852 | A | * | 5/1995 | Itami et al. ................. 713/193 |
| 6,556,679 | B1 | * | 4/2003 | Kato et al. .................. 713/200 |
| 2004/0090895 | A1 | * | 5/2004 | Lee et al. ................. 369/53.22 |
| 2004/0268128 | A1 | * | 12/2004 | Kitani et al. ................ 380/201 |
| 2005/0047299 | A1 | * | 3/2005 | Kikuchi et al. ............ 369/53.2 |
| 2005/0117482 | A1 | * | 6/2005 | Grimm ...................... 369/53.2 |

FOREIGN PATENT DOCUMENTS

JP        09091882 A    *  4/1997

OTHER PUBLICATIONS

U.S. Appl. No. 10/467,339, filed Aug. 21, 2003, Sako et al.
U.S. Appl. No. 10/472,492, filed Sep. 30, 2003, Inokuchi et al.

* cited by examiner

*Primary Examiner*—R. Stephen Dildine
(74) *Attorney, Agent, or Firm*—Oblon, Spivak, McClelland, Maier & Neustadt, P.C.

(57) ABSTRACT

A recording medium includes an area in which data encoded with an error correction code is recorded. In the recording medium, data which contains an error uncorrectable with the error correction code, and data which does not contain an error uncorrectable with the error correction code are recorded in predetermined pattern.

38 Claims, 14 Drawing Sheets

DATA RECORDING MEDIUM, DATA RECORDING METHOD AND APPARATUS, DATA PLAYBACK METHOD AND APPARATUS, AND DATA DETERMINATION METHOD

BACKGROUND OF THE INVENTION

1. Field of the Invention

The present invention relates to a recording medium, a recording method of a recording medium, a recording apparatus of a recording medium, a playback method of a recording medium, a playback apparatus of a recording medium, and a data determination method. In particular, the present invention relates to a recording medium in which data encoded with error correction coding is recorded, a recording method of the recording medium, a recording apparatus of the recording medium, a playback method of the recording medium, a playback apparatus of the recording medium, and a data determination method for determining data encoded with error correction coding.

2. Description of the Related Art

Optical discs such as CDs (Compact Discs) having music data recorded therein (hereinafter referred to as "CD-DA (Compact Disc Digital Audio)") and CD-ROM (Compact Disc Read-Only Memory) discs are widely accepted as data recording media because such discs are easy to handle and inexpensive. Recently, CD-R (Compact Disc Recordable) discs capable of recording data or CD-RW (Compact Disc ReWritable) discs capable of rewriting data have been commercially available, and users can easily record data in such optical discs. Optical discs complying with the CD standards, including CD-DA, CD-ROM, CD-R, and CD-RW discs, have become dominant in the field of data recording media. In recent years, it has been accomplished to compress audio data in the format of MP3 (MPEG1 Audio Layer-3) or ATRAC3 (Adaptive TRansform Acoustic Coding 3) (trademark) and to record the compressed data in discs such as CD-ROM, CD-R, and CD-RW discs.

However, with the advent of CD-R or CD-RW discs, data recorded in CD-DA or CD-ROM discs has been able to be easily copied, and the demands for copyright protection have been increasingly required. Therefore, it is necessary to take some action for copyright protection of content data when the content data is recorded in a CD-DA or CD-ROM disc.

One method for protecting content data recorded in a CD-DA or CD-ROM disc is to encode the content data before the data is recorded in the disc. The content data encoded before being recorded in a disc cannot be decoded unless data decoding key for decoding the content data is obtained, so that the content data can be protected. Another method is to add DRM (Digital Rights Management) data which indicates copyright protection information of content data so as to establish a playback and copy restriction system of the content data.

Initially, a system employing CD discs was a playback-only recording medium, and is therefore difficult to achieve effective copyright protection. In particular, some existing CD-R or CD-RW drives have a disc-copy function. Such drives enables data in one disc to be copied to another disc. The disc-copy function would allow copying content data even if the content data is encoded or has DRM data recorded therein.

In order to address illegal copying of content data by a disc copy, a method is required for determining whether data recorded in a disc is original data or copied data.

For example, one method for determining whether data recorded in a CD-ROM disc is original data or copied data utilizes the characteristics of CD-ROM data encoded with error correction coding. CD-ROM data is encoded with CIRC (cross-interleaved Reed-Solomon code) error correction coding, and is error corrected in order to increase the error correction performance. In a known method, an error correction code, a sync pattern, a header, a scrambled signal, etc., are intended to be corrupted in CD-ROM (CD-ROM mode 1) and, based on whether or not the corrupted error correction code, sync pattern, header, scrambled signal, etc., are present, it is determined whether or not the disc is an original disc.

However, some recent CD-R or CD-RW drives are able to generate this type of error, and application software for making a disc copy using such a method may be commercially available. Thus, this method may be no longer useful for determining whether data recorded in a CD disc is original data or copied data.

SUMMARY OF THE INVENTION

It is therefore an object of the present invention to provide a recording medium which solves the above-mentioned problem.

It is another object of the present invention to provide a recording method of a recording medium which solves the above-mentioned problem.

It is a further object of the present invention to provide a recording apparatus of a recording medium which solves the above-mentioned problem.

It is a still further object of the present invention to provide a playback method of a recording medium which solves the above-mentioned problem.

It is a yet further object of the present invention to provide a playback apparatus of a recording medium which solves the above-mentioned problem.

It is another object of the present invention to provide a data determination method which solves the above-mentioned problem.

According to the present invention, a recording medium is provided, including an area in which data encoded with an error correction code is recorded. In the recording medium, erroneous uncorrectable data which contains an uncorrectable error which cannot be corrected with the error correction code, and erroneous correctable data which does not contain an uncorrectable error which cannot be corrected with the error correction code are recorded by a predetermined pattern.

According to the present invention, a recording method is provided. The recording method includes the steps of recording data encoded with an error correction code in a recording area of a recording medium; and recording erroneous uncorrectable data which contains an uncorrectable error which cannot be corrected with the error correction code and erroneous correctable data which does not contain an uncorrectable error which cannot be corrected with the error correction code by a predetermined pattern at a predetermined position of the recording medium.

According to the present invention, a recording apparatus of a recording medium is provided, including a recording unit, an error correction coding unit, a modulation unit, and a data generation unit. The recording unit records data in the recording medium. The error correction coding unit encodes input data with a first error correction code. The modulation unit modulates the output data of the error correction coding unit, and outputs the modulated data to the recording unit.

The data generation unit generates data which can be decoded with both the first error correction code and a second error correction code different from the first error correction code, and supplies the generated data to the error correction coding unit.

According to the present invention, a playback apparatus of a recording medium is provided. The playback apparatus includes a head, a demodulation unit, an error correction unit, and a determination unit. The head reads data recorded in the recording medium. The demodulation unit demodulates the output signal of the head. The error correction unit performs error correction on the output data of the demodulation unit. The determination unit determines the recording medium based on whether or not the result of the error correction performed by the error correction unit is a predetermined result.

According to the present invention, a playback method of a recording medium is provided. The playback method includes the steps of reading data recorded in the recording medium, demodulating the read data, performing error correction on the demodulated data, and determining the recording medium based on whether or not the result of the error correction is a predetermined result.

According to the present invention, a data determination method is provided. The data determination method includes the steps of performing error correction on transmitted data, and determining whether or not the transmitted data is original data based on whether the result of the error correction is a predetermined result.

DESCRIPTION OF THE PREFERRED EMBODIMENTS

The present invention is described below with reference to the drawings considered together with an embodiment thereof. In this embodiment, a novel optical disc is used as a recording medium. The optical disc of the present invention complies with substantially the same physical standards, such as size, as that of a CD-DA disc, and an existing disk drive can be used to read information on the disc optically.

The optical disc of the present invention contains encoded content data. The encoded content data may be the encoded version of content data such as audio or image data in CD-ROM format or in CD-DA format. The content data may be encoded using an encryption technique such as DES (Data Encryption Standard). The content data is further compressed using ATRAC3 (Adaptive TRansform Acoustic Coding 3) (trademark), MP3 (MPEG1 Audio Layer-3), AAC (MPEG2 Advanced Audio Coding), TwinVQ (Transform-domain Weighted Interleave Vector Quantization), or the like, as required.

Figure 1:
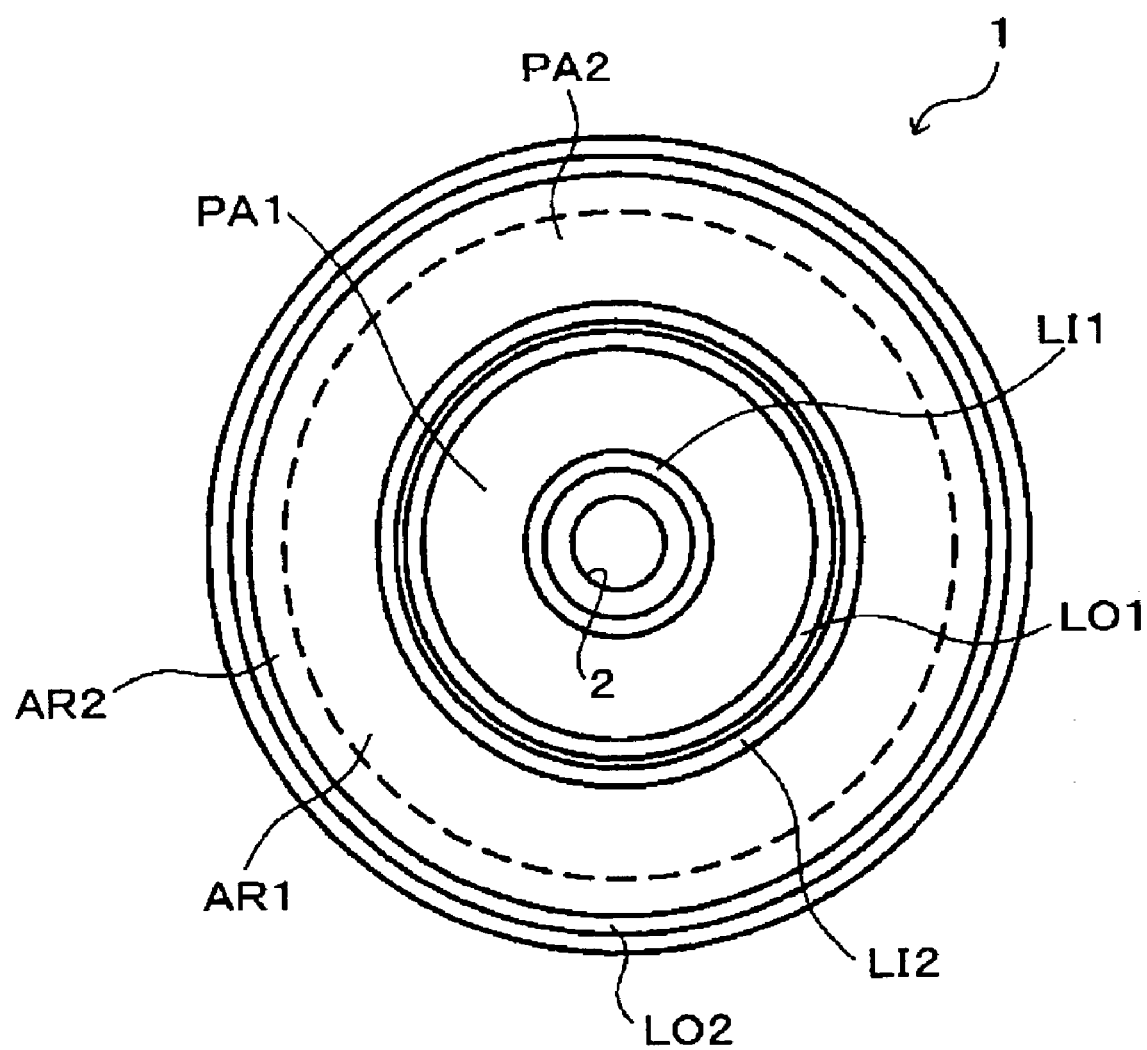
FIG. 1 is a plan view of an optical disc according to the present invention.

Referring to FIG. 1, an optical disc 1 of the present invention has a diameter of 120 mm, and a hole 2 is formed at the center of the optical disc 1. The optical disc 1 may be a disc with a diameter of 80 mm known as a "CD single".

The optical disc 1 may be a playback-only disc, a recordable disc, or a rewritable disc.

If the optical disc 1 is a playback-only disc, the recording layer of the optical disc 1 is made of aluminum. Information is recorded in patterns of physical pits on the playback-only optical disc 1, and a disc is typically manufactured using a stamper.

If the optical disc 1 is a recordable disc, the recording layer of the optical disc 1 is made of organic dye such as phthalocyanine or cyanine dye. The recording layer made of such an organic dye is heated by a laser during the recording process. Then, the organic dye is melted.

If the optical disc 1 is a rewritable disc, the recording layer of the optical disc 1 is made of a phase change material. Examples of the phase change materials include Ag—In—Sb—Te (silver-indium-antimony-tellurium) alloy. The phase change material has both a crystal phase and an amorphous phase. During the recording process, the phase change recording layer is heated to the melting point or higher, and is then cooled rapidly to an amorphous state. During the erasing process, the phase change recording layer is heated nearly to the crystallization temperature, and is then cooled gradually to a crystalline state.

Figure 2:
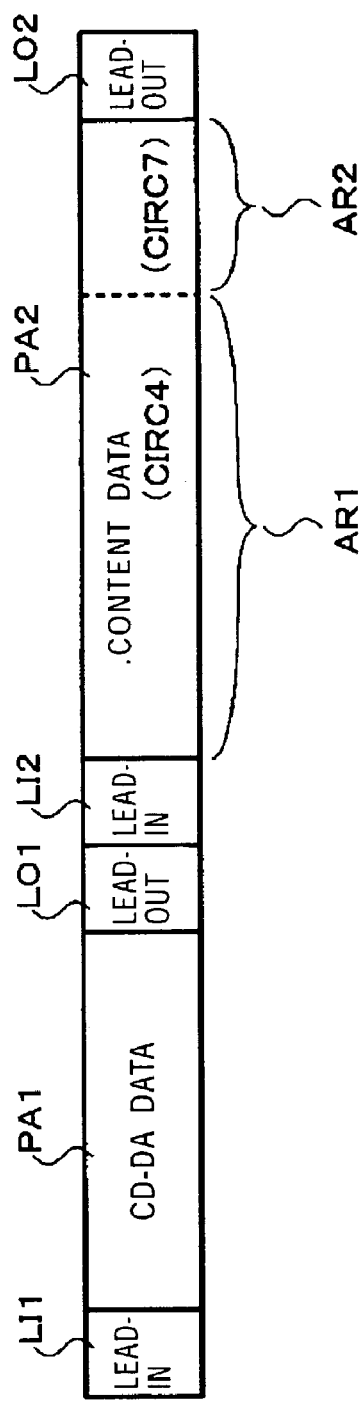
FIG. 2 is a schematic diagram of the optical disc of the present invention.

As shown in FIGS. 1 and 2, the optical disc 1 includes a first lead-in area LI1 at the innermost circumference thereof, a first program area PA1 surrounding the first lead-in area LI1, and a first lead-out area LO1 surrounding the first program area PA1. The first program area PA1 contains audio data in a similar recording format to CD-DA format. Since the data in the first program area PA1 is in a similar recording format to that of CD-DA discs, and is not encoded, the data can be played back using a general-purpose music player.

The optical disc 1 is further formed of a second lead-in area LI2 surrounding the first lead-out area LO1, a second program area PA2 surrounding the second lead-in area LI2, and a second lead-out area LO2 surrounding the second program area PA2. The second program area PA2 contains as content data audio which is compressed using for example ATRAC3, as discussed above, which is encoded.

The second program area PA2 is divided into two subareas AR1 and AR2. The subarea AR1 has data recorded therein which is encoded with error correction coding similar to that in typical CD-DA or CD-ROM discs (hereinafter referred to as a "CIRC4"). The subarea AR2 has data recorded therein which is encoded with error correction coding which will be employed in double density CD discs (hereinafter referred to as "CIRC7"). The data recorded in the subarea AR2 includes data pattern which can also be decoded with the CIRC4 error correction code. The CIRC7 scheme is described in Japanese Laid-Open Patent No. 9-91882.

The data recorded in the subarea AR1 of the second program area PA2 is encoded with a CIRC4 error correction code in order to provide compatibility with CD-DA discs.

In the optical disc 1 of the present invention, as discussed above, the second program area PA2 is divided into two subareas AR1 and AR2 containing data encoded with different error correction codes. The data recorded in the subarea AR1 is encoded with a CIRC4 error correction code while the data recorded in the subarea AR2 is encoded with a CIRC7 error correction code. The subarea AR2 also contains data pattern which can be decoded with both the CIRC7 and CIRC4 error correction codes.

An error correction code is applied for detection or correction of a burst error or random error. In the optical disc 1 of the present invention, however, as described below, the characteristics of the CIRC4 and CIRC7 error correction codes can be used to determine whether the data recorded in the optical disc 1 is original data or copied data based on the error corrected data in the subarea AR2.

A description is now given of the CIRC4 error correction code and the CIRC7 error correction code.

CDs employ CIRC error correction coding in which data is encoded with dual error correction coding in a C1 (vertical) sequence and in a C2 (diagonal) sequence. The thereby error correction coded data is subjected to eight-to-fourteen (EFM) modulation per frame, and is recorded.

Figure 3:
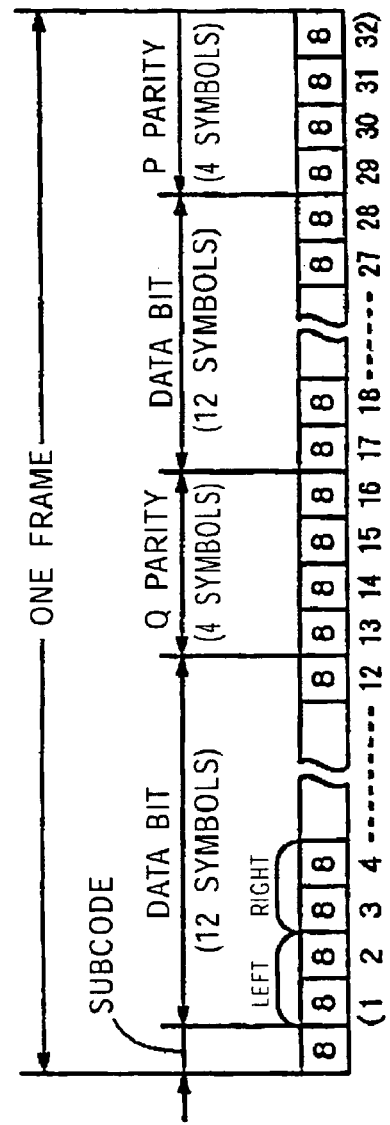
FIG. 3 is a block diagram of the optical disc of the present invention.

FIG. 3 shows one frame of the CD data structure before the EFM modulation.

As shown in FIG. 3, when audio data is sampled in units of 16 bits, one frame is formed of data bits of 24 symbols (one symbol is in the form of 8 bits obtained by halving 16 bits) corresponding to six samples for the left (L) and six samples for the right (R), P parity of four symbols, Q parity of four symbols, and a subcode of one symbol. One-frame data recorded on the disc is EFM modulated to convert from 8-bit data to 14-bit data, and a DC suppression bit and a frame sync are added to the data.

Therefore, one-frame data recorded on the disc is formed of:
  24-channel-bit frame sync;
  336-channel-bit data bits (given by 14×24=336);
  14-channel-bit subcode;
  112-channel-bit parity (given by 14×8=112); and
  102-channel-bit margin bits (given by 3×34=102).

The total of 588 channel bits constitute one frame.

Figure 4:
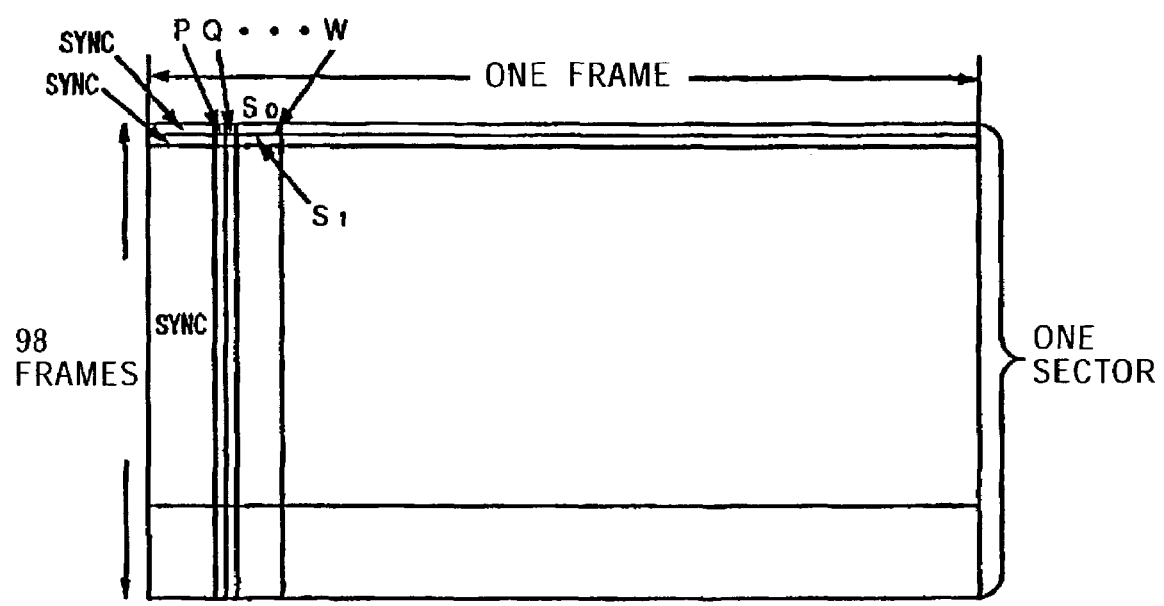
FIG. 4 is a schematic diagram of the optical disc of the present invention.

In one frame, the subcode (one symbol) includes eight channels P to W each in the form of one bit. As shown in FIG. 4, one sector is composed of 98-frame data (the subcode spans 98 contiguous frames). In the subcode, the first two frames of 98 frames are designated by subcode frame sync characters $S_0$ and $S_1$. When data is recorded in an optical disc such as CD-ROM, 98 frames (2,352 bytes) of a period of the subcode constitute one sector.

Figure 5:
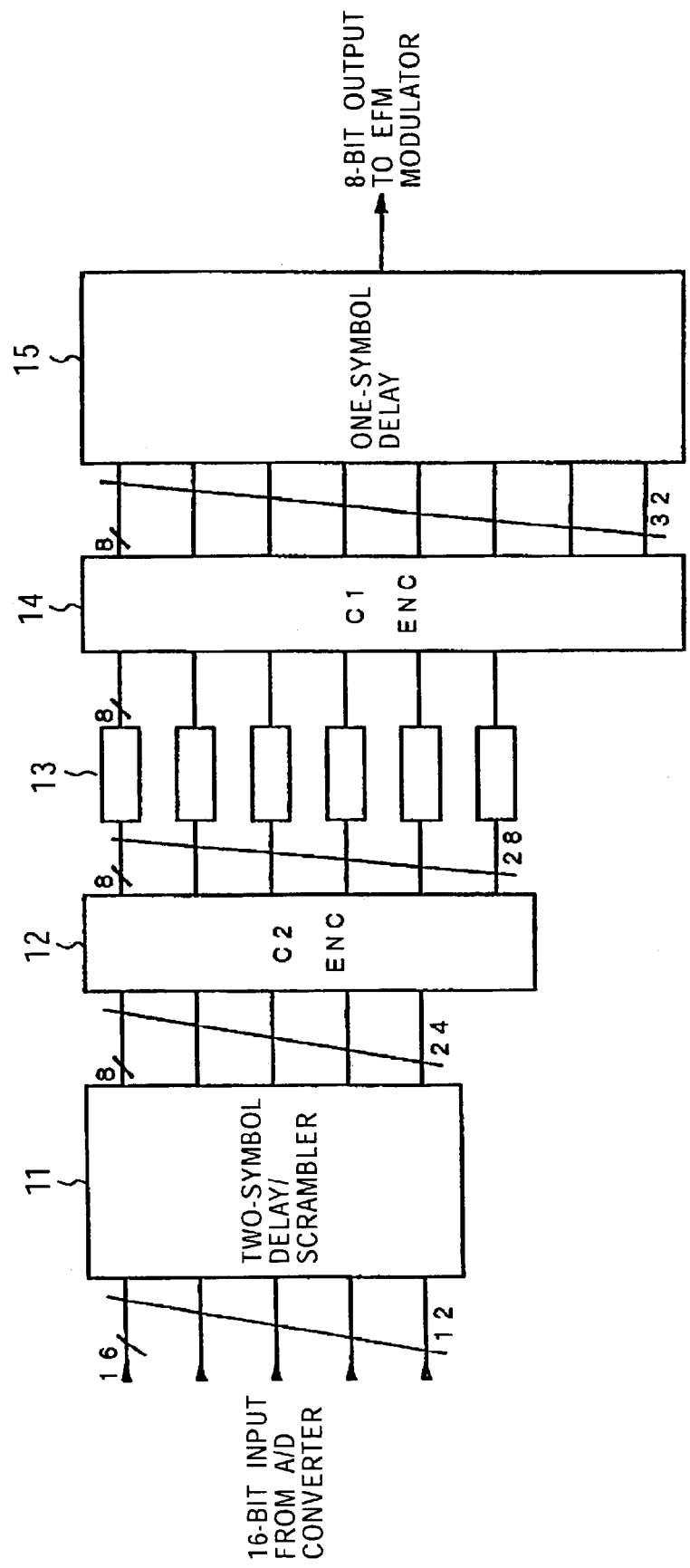
FIG. 5 is a schematic block diagram for illustrating the recording format of the optical disc of the present invention.
Figure 6:
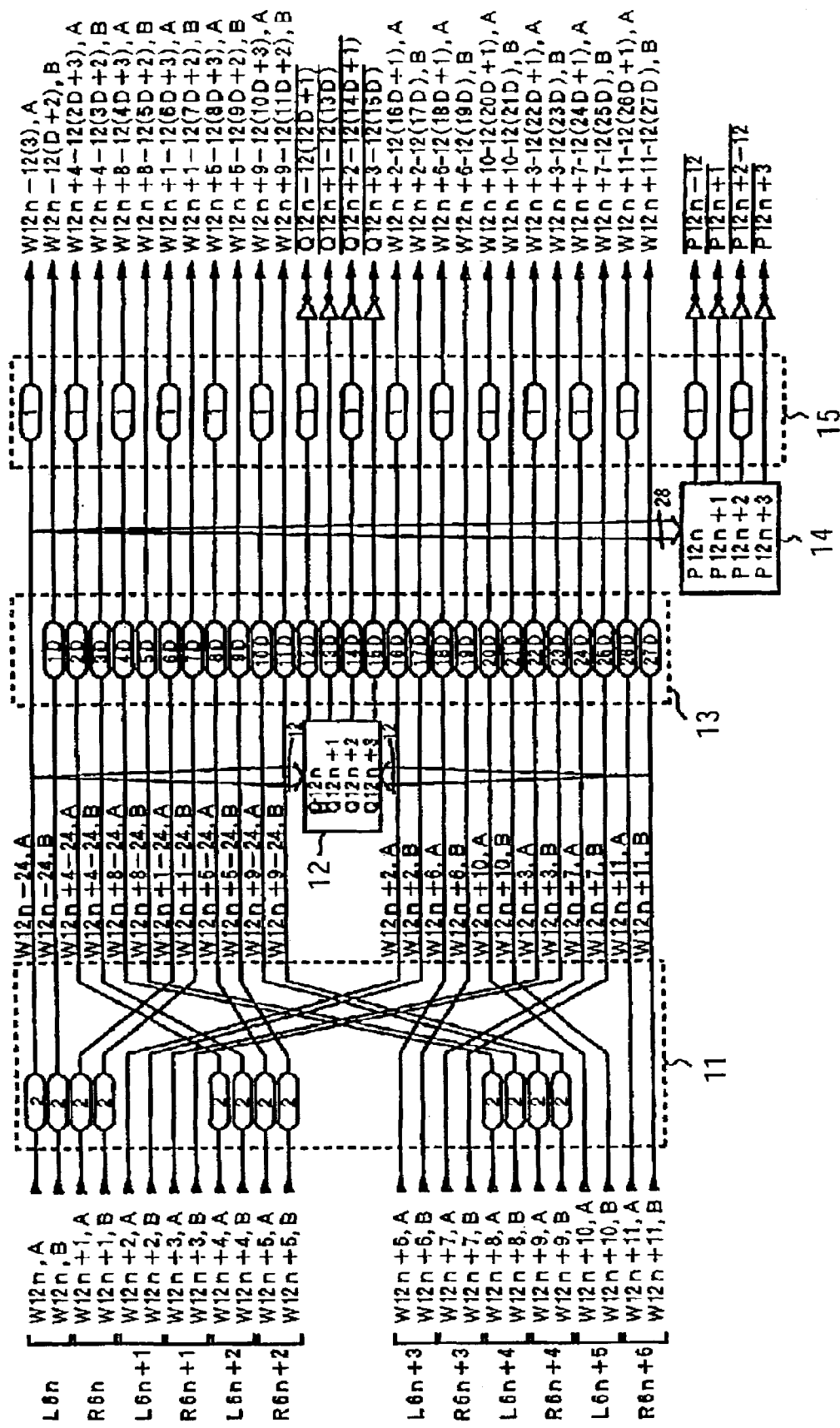
FIG. 6 is a schematic diagram for illustrating the recording format of the optical disc of the present invention.

FIGS. 5 and 6 are block diagrams illustrating a CIRC encoding process. In the following description of CIRC encoding/decoding, audio data is encoded, by way of example, to facilitate the understanding.

In an audio signal, 24 symbols (W12n,A; W12n,B; ... W12n+11,A; and W12n+11,B) in which one word is divided into the upper eight bits and the lower eight bits (the upper eight bits are designated by A and the lower eight bits are designated by B) are supplied to a two-symbol delay/scrambling circuit 11. The two-symbol delay processing is performed on the even-word data indicated by L6n, R6n, L6n+2, R6n+2, etc., so that, if an error occurs in all the C2 sequence, the error may be interpolated in a C2 encoder 12. The scrambling is performed in order to obtain the maximum burst-error interpolation length.

The data output from the two-symbol delay/scrambling circuit 11 is supplied to the C2 encoder 12. In the C2 encoder 12, the data is encoded with a (28, 24, 5) Reed-Solomon code over $GF(2^8)$ so as to generate the Q parity of four symbols Q12n, Q12n+1, Q12n+2, and Q12n+3.

The output (28 symbols) of the C2 encoder 12 is supplied to the interleaving circuits 13. The interleaving circuits 13 provide delay amounts which vary by an equal difference, such as 0, D, 2D, etc., for the symbols, where D indicates the unit delay amount, so as to interleave the symbols.

The output of the interleaving circuits 13 is supplied to a C1 encoder 14. A (32, 28, 5) Reed-Solomon code over $GF(2^8)$ is used as a C1 code. The P parity of four symbols P12n, P12n+1, P12n+2, and P12n+3 are generated from the C1 encoder 14. The minimum distance of both the C1 code and the C2 code is five. This enables two-symbol errors to be corrected, and enables four-symbol errors to be corrected by erasing (if the position of error symbols is known).

The 32 symbols from the C1 encoder 14 are supplied to a one-symbol delay circuit 15. The one-symbol delay circuit 15 allows adjacent symbols to be spaced apart from each other, thus preventing occurrence of a two-symbol error due to an error over the adjacent symbols. The Q parity is inverted by an inverter in order to detect an error even when all data and parities become zero.

The unit delay amount D of the interleaving circuit 13 in CIRC4 is different from that in CIRC7. The interleaving circuits 13 enable burst errors to be dispersed.

Specifically, in CIRC4, the unit delay amount D is equal to four frames, and adjacent symbols are located four frames apart. The CIRC4 scheme in which D=4 frames is used in the present CD-DA standard. In CIRC4, the maximum delay amount is 27D (=108 frames), and the total interleave length is 109 frames.

In CIRC7, the unit delay amount D is equal to seven frames, and adjacent symbols are located seven frames apart. The CIRC7 scheme in which D=7 frames will be used in the double density CD standard. In CIRC7, the maximum delay amount is 27D (=189 frames), and the total interleave length is 190 frames.

Figure 7:
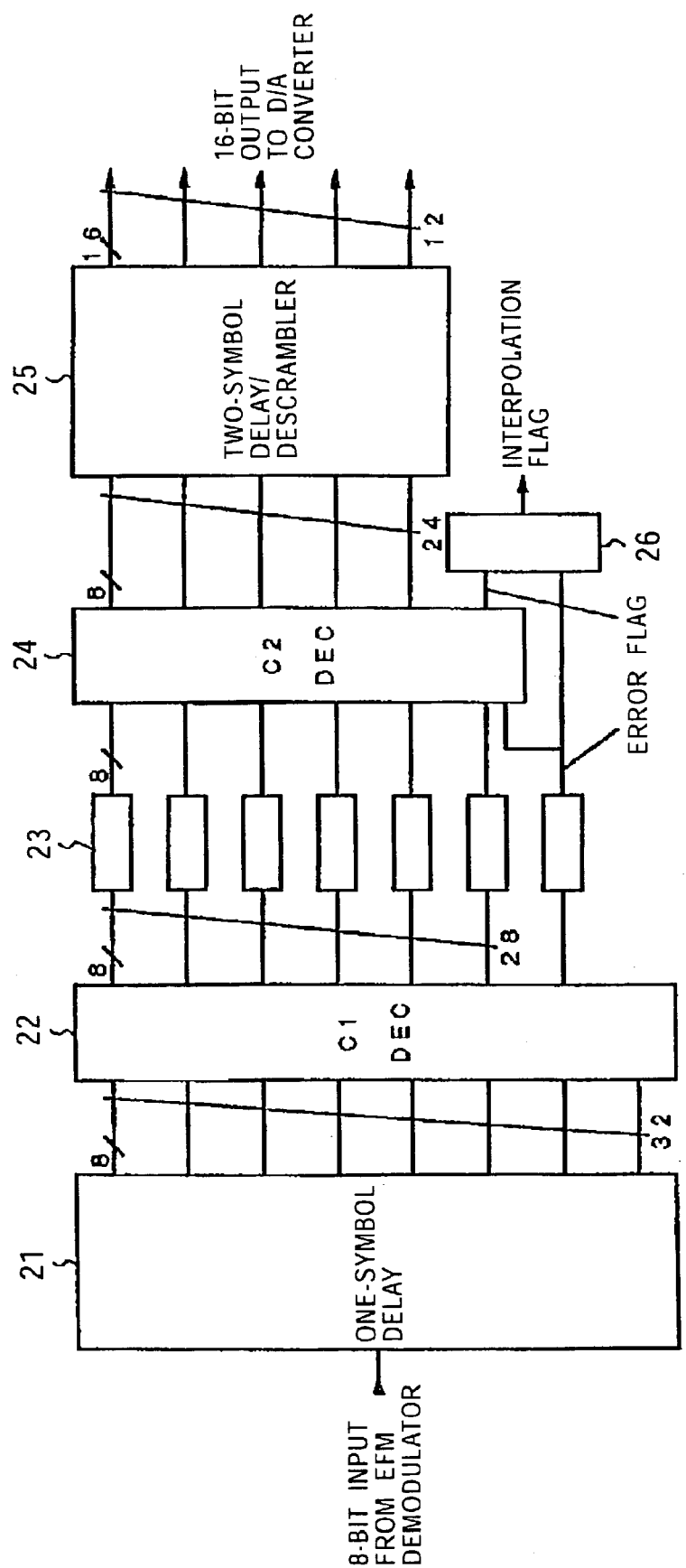
FIG. 7 is a schematic block diagram for illustrating the recording format of the optical disc of the present invention.
Figure 8:
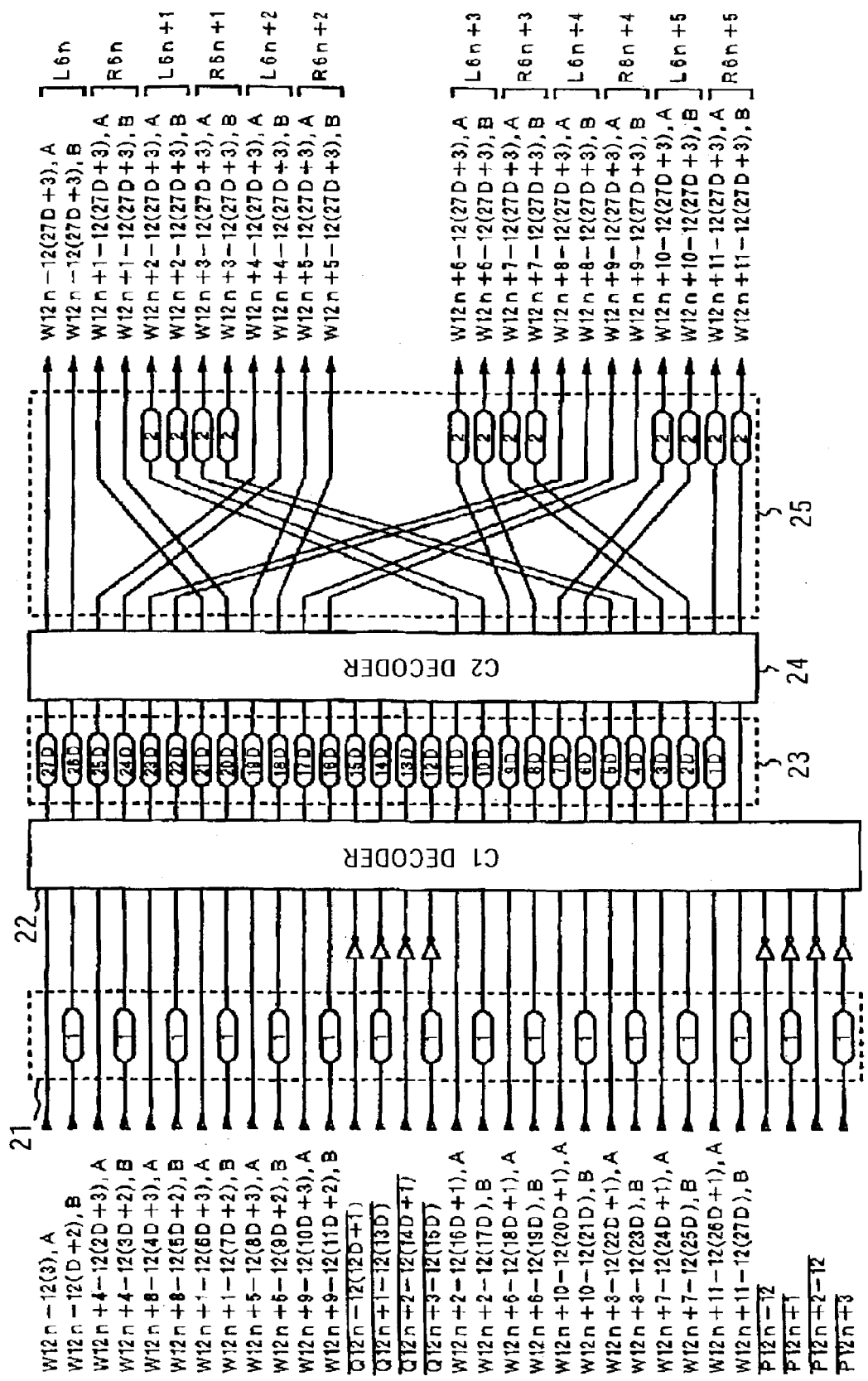
FIG. 8 is a schematic diagram for illustrating the recording format of the optical disc of the present invention.

FIGS. 7 and 8 are block diagrams illustrating a decoding process. The decoding process is performed in a reverse manner to the above-described encoding process.

First, playback data from an EFM demodulation circuit is supplied to a one-symbol delay circuit 21. The delay added by the one-symbol delay circuit 15 in the encoding system is cancelled by the one-symbol delay circuit 21.

The 32 symbols from the one-symbol delay circuit 21 are supplied to a C1 decoder 22. The output data of the C1 decoder 22 is supplied to the deinterleaving circuits 23. The deinterleaving circuits 23 provide delay amounts which vary by an equal difference, such as 27D, 26D, . . . , D, and 0, for the 28 symbols so as to cancel the delay amounts provided by the interleaving circuits 13.

The unit delay amount D of the deinterleaving circuits 23 is equal to four frames in CIRC4, and is equal to seven frames in CIRC7.

The output data of the deinterleaving circuits 23 is supplied to a C2 decoder 24 for decoding the C2 code. The output (24 symbols) of the C2 decoder 24 is supplied to a two-symbol delay/descrambling circuit 25. The decoded data of 24 symbols is output from the two-symbol delay/descrambling circuit 25.

An interpolation flag is generated by an interpolation flag generation circuit 26 based on error flags from the C1 decoder 22 and the C2 decoder 24. The interpolation flag is used to interpolate error data.

Accordingly, CIRC employs dual error correction coding in both the vertical C1 sequence and the diagonal C2 sequence. The interleave lengths in CIRC4 and CIRC7 differ from each other.

Figure 9:
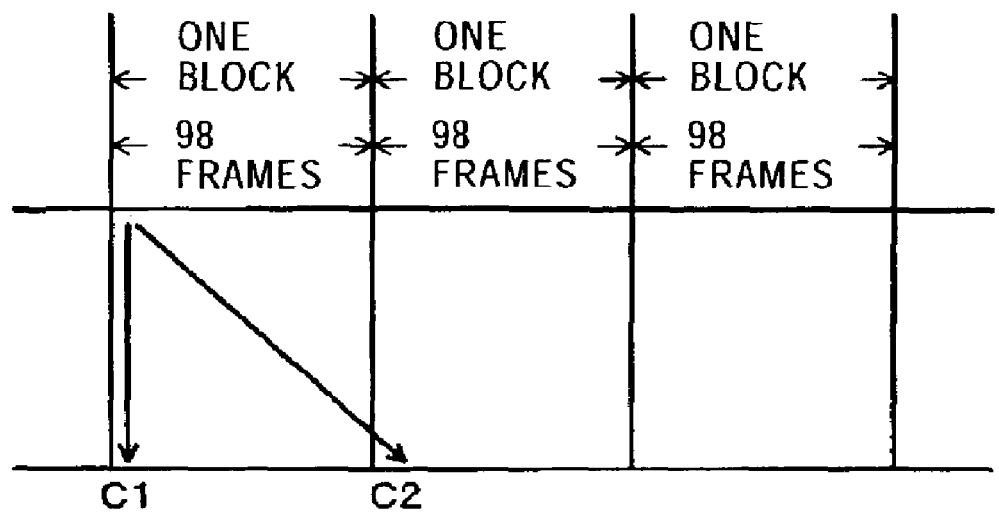
FIG. 9 is a schematic diagram for illustrating the interleaving process in CIRC4.
Figure 10:
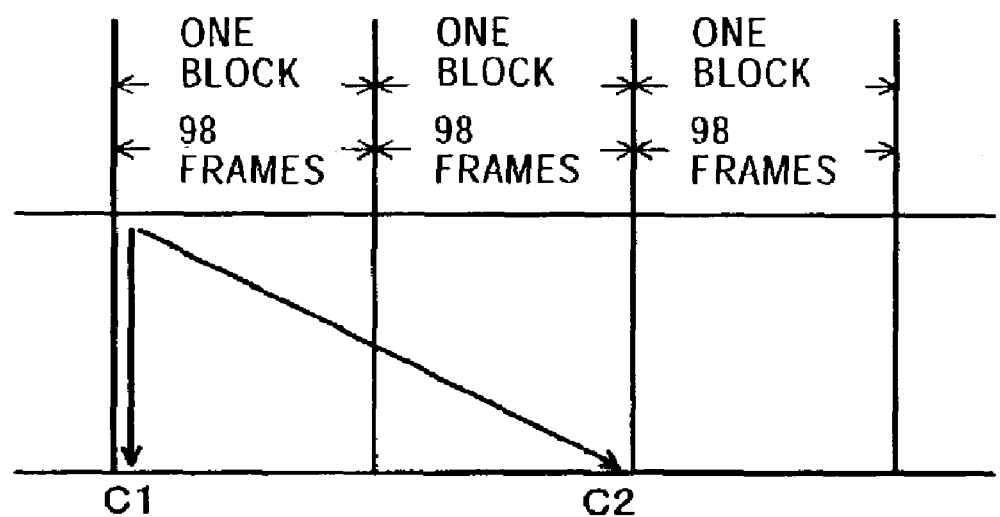
FIG. 10 is a schematic diagram for illustrating the interleaving process in CIRC7.

In CIRC4, as shown in FIG. 9, the unit delay amount D is equal to four frames, and the total interleave length is 109 (=108+1) frames, which is slightly greater than one block. In CIRC7, as shown in FIG. 10, the unit delay amount D is equal to seven frames, and the total interleave length is 190 (=189+1) frames, which is slightly smaller than two blocks.

The total interleave length defines the correction performance for burst errors which indicate consecutive bad bits caused by fingerprints on an optical disc, scratches, etc. The greater the total interleave length is, the higher is the correction performance for burst errors. Since double density CDs require high correction performance for burst errors, it is proposed that CIRC7 error correction coding is used in the double density CDs to achieve high correction performance for burst errors.

In the optical disc 1 of the present invention, therefore, the data encoded with CIRC7 error correction coding is recorded in the subarea AR2, and the subarea AR2 also contains data pattern which can be decoded with both the CIRC7 and CIRC4 error correction codes. The data which can be decoded with both the CIRC7 and CIRC4 error correction codes is now described.

As discussed above, since the interleave lengths in CIRC4 and CIRC7 differ from each other, a CIRC4 decoder is not able to decode data encoded with CIRC7 error correction coding. In contrast, a CIRC7 decoder is not able to decode data encoded with CIRC4 error correction coding.

However, data in a particular array can be decoded by both a CIRC4 decoder and a CIRC7 decoder.

Figure 11:
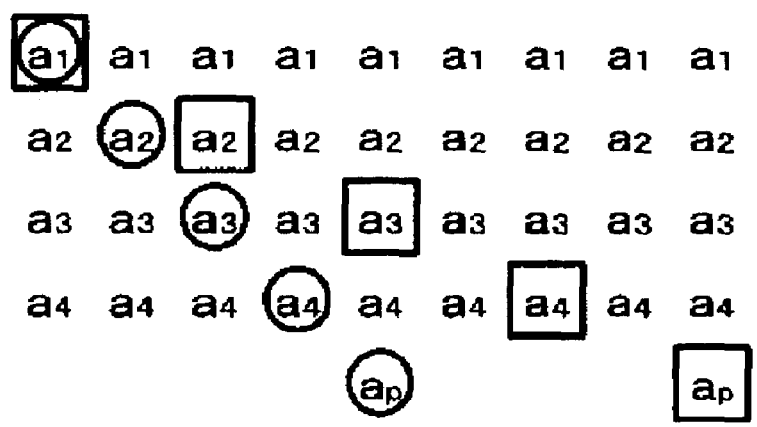
FIG. 11 is schematic diagram for illustrating data which can be decoded with both the CIRC4 and CIRC7 error correction codes.

FIG. 11 illustrates a data array supported by both a CIRC4 decoder and a CIRC7 decoder. In the data array shown in FIG. 11, predetermined data pattern based on the vertical or C1 sequence is repeated in a two-dimensional array of data. In the example shown in FIG. 11, data pattern of a1, a2, a3, and a4 is repeated in the vertical direction.

In this data array, the same data type is aligned in each horizontal line. Specifically, as shown in FIG. 11, all the data aligned in the first horizontal line is a1, all the data aligned in the second horizontal line is a2, all the data aligned in the third horizontal line is a3, and all the data aligned in the fourth horizontal line is a4.

When such a data array is used in both CIRC4 and CIRC7 error correction coding, data pattern similar to that in the C1 sequence is repeated in the C2 sequence. In the example shown in FIG. 11, irrespective of the total interleave length (i.e., the diagonal angle), the C2 parity is always composed of a data pattern of a1, a2, a3, and a4.

When data having such a data array is encoded with CIRC7 error correction coding, the data can be decoded by a CIRC4 decoder. When data having such a data array is encoded with CIRC4 error correction coding, the data can be decoded by a CIRC7 decoder.

As discussed above, since the interleave lengths in CIRC4 and CIRC7 differ from each other, normally, data encoded with CIRC7 error correction coding cannot be decoded by a CIRC4 decoder, and data encoded with CIRC4 error correction coding cannot be decoded by a CIRC7 decoder. However, data which is constructed such that predetermined data pattern is repeated in the vertical direction would be supported by both a CIRC7 decoder and a CIRC4 decoder.

According to the optical disc of the present invention, therefore, the characteristics of data supported by both a CIRC7 decoder and a CIRC4 decoder are used to determine whether data recorded in the disc is original data or copied data. This procedure is now described.

Figure 12:
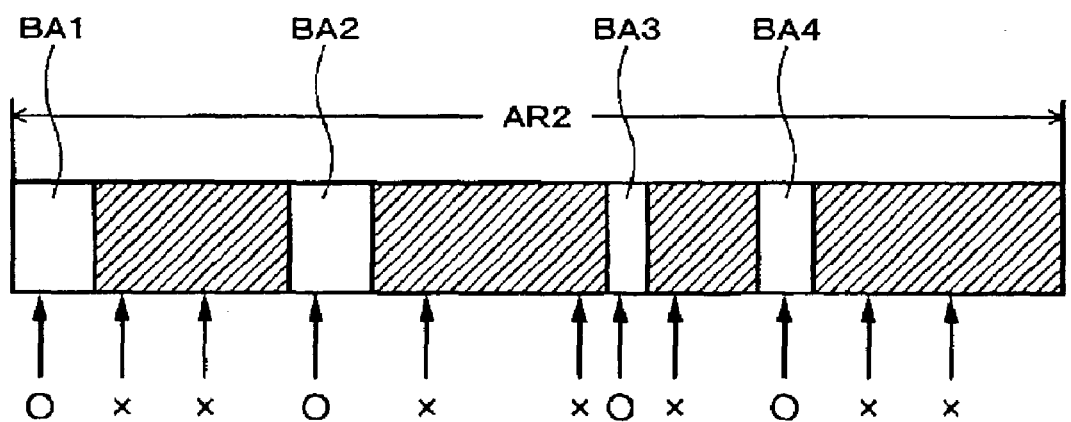
FIG. 12 is a schematic diagram of the optical disc of the present invention.

FIG. 12 shows the subarea AR2 of the second program area PA2 in the optical disc 1 shown in FIGS. 1 and 2.

As discussed above, the subarea AR2 contains data encoded with CIRC7 error correction coding, and a data pattern which can be decoded by both the CIRC7 and CIRC4 error correction codes is also contained in the subarea AR2. In FIG. 12, portions BA1, BA2, BA3, and BA4 contain data which can be decoded with both the CIRC7 and CIRC4 error correction codes, and the remaining portions contain data encoded with CIRC7 error correction coding. In FIG. 12, the "O" mark indicates that no error uncorrectable with the CIRC4 error correction code occurs, and "x" mark indicates that an error uncorrectable with the CIRC4 error correction code occurs. The data which can be decoded with both the CIRC7 and CIRC4 error correction codes is such that a predetermined data pattern based on the vertical (C1) sequence is repeated, as shown in FIG. 11.

As discussed above, the optical disc 1 of the present invention is provided with the subarea AR2 which contains data encoded with CIRC7 error correction coding, and the subarea AR2 also contains data portions which can be decoded with both the CIRC7 and CIRC4 error correction codes in predetermined pattern at predetermined position. With this structure, it is determined whether the disc is an original disc or a copied disc.

Figure 13:
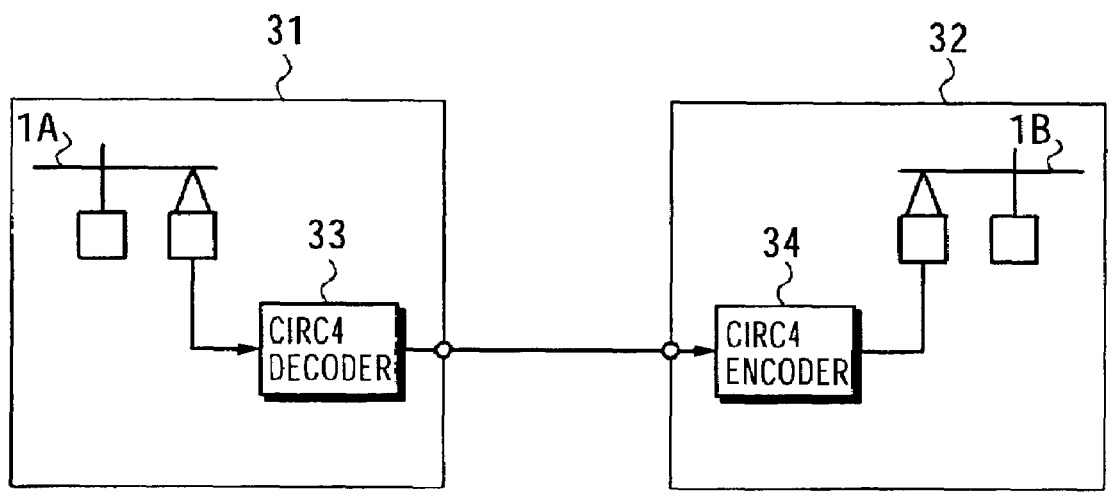
FIG. 13 is a block diagram for illustrating a disc copy according to the present invention.

FIG. 13 schematically shows a disc copy from an original optical disc 1A to an optical disc 1B.

In FIG. 13, the original optical disc 1A is an optical disc according to the present invention. The subarea AR2 of the optical disc 1A contains data encoded with CIRC7 error correction coding, and the data portions BA1, BA2, BA3, etc., which can be decoded with both the CIRC4 and CIRC7 error correction codes are also contained in a predetermined pattern at a predetermined position of the area AR2, as shown in FIG. 12.

When the original optical disc 1A is installed in a playback apparatus 31, the data in the optical disc 1A is read. Typically, CD-DA, CD-ROM, CD-R, or CD-RW discs employ CIRC4 error correction coding. The playback apparatus 31 plays back a CD-DA, CD-ROM, CD-R, or CD-RW disc, and includes a CIRC4 error correction decoding circuit 33 for performing CIRC4 error correction.

The data in the original optical disc 1A installed in the playback apparatus 31 is error corrected in the CIRC4 error correction decoding circuit 33.

As shown in FIG. 12, the original optical disc 1A is provided with the subarea AR2 which contains data encoded with CIRC7 error correction coding. When the playback data in the subarea AR2 is error corrected in the CIRC4 error correction decoding circuit 33, an uncorrectable error occurs in most of the data, except for the data portions BA1, BA2, BA3, etc. which can be decoded with both the CIRC4 and CIRC7 error correction codes.

The procedure for handling an uncorrectable error differs from one device to another. Typically, an uncorrectable error can be filled with interpolation data. Alternatively, the playback operation can be terminated due to failure at the time when an uncorrectable error occurs. Although termination of the playback operation prevents a disc copy of the optical disc 1A, it is assumed herein that an uncorrectable error is filled with interpolation data.

The playback data in the optical disc 1A which is played back by the playback apparatus 31 is transmitted to a recording apparatus 32. Assuming that an uncorrectable error has been filled with interpolation data by the playback apparatus 31, data output from the playback apparatus 31 has interpolation data mostly filled in the data recorded in the subarea AR2 is.

The optical disc 1B is inserted to the recording apparatus 32. The recording apparatus 32 includes a CIRC4 encoding circuit 34 for performing CIRC4 error correction coding.

The data input to the recording apparatus 32 is supplied to the CIRC4 encoding circuit 34. The input data is encoded with CIRC4 error correction coding in the CIRC4 encoding circuit 34. Thus, the CIRC4 error correction coded data is recorded in the optical disc 1B.

As discussed above, the data output from the playback apparatus 31 has interpolation data mostly filled in the data recorded in the subarea AR2. In the CIRC4 encoding circuit 34, a CIRC4 error correction code is applied to the interpolation data.

Figure 14A:
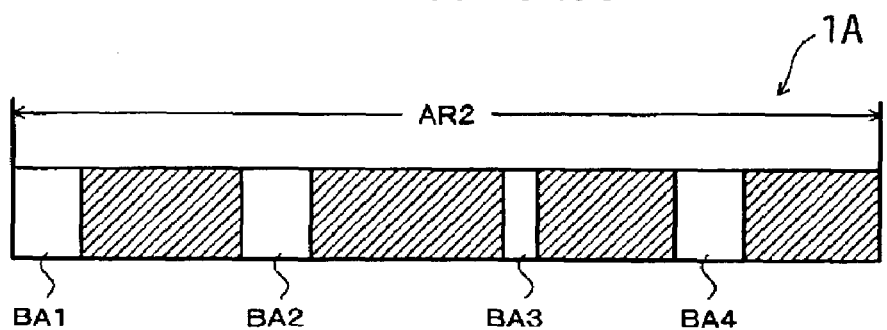
FIGS. 14A and 14B are schematic diagrams of the optical disc of the present invention.
Figure 14B:
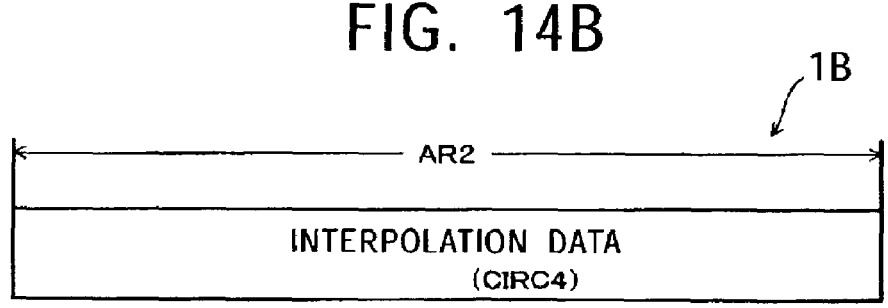

As a result, in the copied optical disc 1B, the interpolation data encoded with CIRC4 error correction coding is recorded in the subarea AR2, as shown in FIG. 14B. In contrast, as shown in FIG. 14A, the subarea AR2 in the original optical disc 1A contains data encoded with CIRC7 error correction coding, and the data portions BA1, BA2, BA3, etc. which can be decoded with both the CIRC4 and CIRC7 error correction codes are also recorded in a predetermined pattern at a predetermined position of the subarea AR2.

As is apparent from comparison between the original disc 1A shown in FIG. 14A and the copied disc 1B shown in FIG. 14B, the data contained in the subarea AR2 in the original optical disc 1A which is encoded with CIRC7 error correction coding, and the data includes the data portions BA1, BA2, BA3, etc. which can be decoded with both the CIRC4 and CIRC7 error correction codes in a predetermined pattern at a predetermined position. In the copied optical disc 1B, in contrast, the data contained in the subarea AR2 is error corrected with the CIRC4 error correction code, and the data portions BA1, BA2, BA3, etc. which can be decoded with both the CIRC4 and CIRC7 error correction codes are not clearly identified.

Therefore, based on whether or not an error occurs in other portions of the subarea AR2 of the optical disc 1 than the data portions BA1, BA2, BA3, etc. which can be decoded with both the CIRC4 and CIRC7 error correction codes, it can be determined whether or not the optical disc 1 is original.

It is assumed that the playback data in the subarea AR2 of the optical disc 1 is decoded with the CIRC4 error correction code. Then, in the original optical disc 1A, the data portions BA1, BA2, BA3, etc. which can be decoded with both the CIRC4 and CIRC7 error correction codes are error corrected, and the remaining portions contains an uncorrectable error. In the copied optical disc 1B, however, since the data recorded in the subarea AR2 is encoded with CIRC4 error correction coding, no error occurs in the data.

There may be a case in which an error occurs in the subarea AR2 due to any other different processing or due to disc damage. In this case, it can be determined that the disc has a problem unless the data portions BA1, BA2, BA3, etc. which can be decoded with both the CIRC4 and CIRC7 error correction codes are detected from the playback data in the subarea AR2.

Accordingly, data encoded with CIRC7 error correction coding is recorded in the subarea AR2, and data portions which can be decoded with both the CIRC7 and CIRC4 error correction codes are included in a predetermined pattern at a predetermined portions of the subarea AR2, thus making it possible to determine whether the disc is an original disc or a copied disc based on error corrected data in the subarea AR2.

Figure 15:
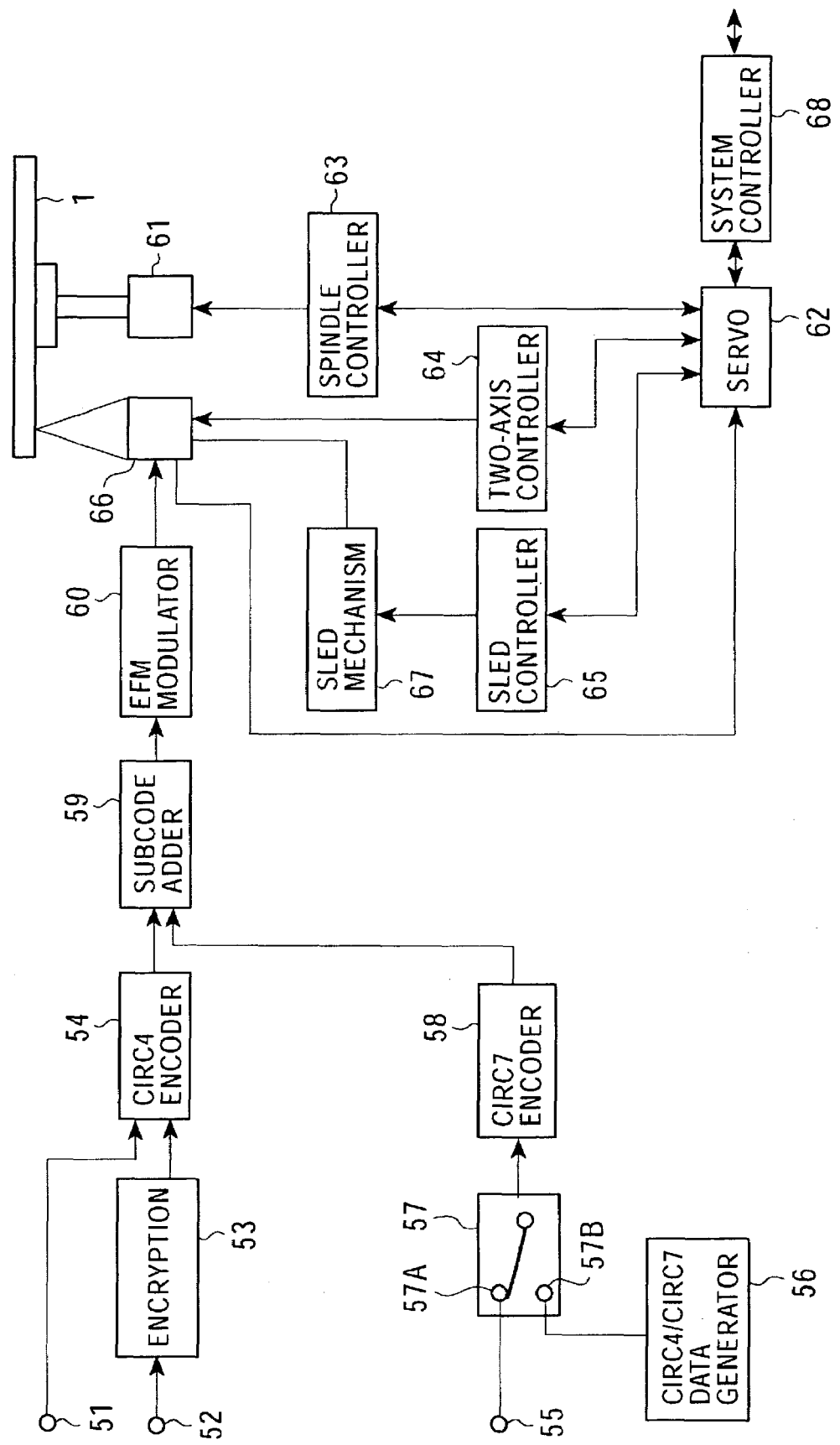
FIG. 15 is a block diagram of an optical disc recording apparatus according to the present invention.

FIG. 15 shows the configuration of a recording apparatus for recording data on the above-noted optical disc 1. In FIG. 15, digital audio data to be recorded in the program area PA1 of the optical disc 1 shown in FIG. 1 is supplied to an input terminal 51.

Content data to be recorded in the program area PA2, audio data which is compressed using, for example, ATRAC3 is supplied to an input terminal 52.

Data to be recorded in the subarea AR2 is supplied to an input terminal 55. The data supplied to the input terminal 55 may be played back only by a dedicated drive; however, the data is not limited thereto, and any data may be supplied to the input terminal 55.

A data generation circuit 56 generates data which can be decoded with both the CIRC4 and CIRC7 error correction codes. The data which can be decoded with both the CIRC4 and CIRC7 error correction codes is such that predetermined data pattern based on the vertical (C1) sequence is repeated when the data is arranged in a two-dimensional array for error correction.

When digital audio data is recorded in the program area PA1 of the optical disc 1, the audio data is supplied from the input terminal 51 to a CIRC4 error correction coding circuit 54.

When compressed audio data is recorded, for example by using ATRAC3 compression, as content data in the subarea AR1 of the program area PA2 of the optical disc 1, the compressed audio data is supplied from the input terminal 52 to an encryption circuit 53. The audio data is then encrypted in the encryption circuit 53. The output of the encryption circuit 53 is supplied to the CIRC4 error correction coding circuit 54.

The CIRC4 error correction coding circuit 54 encodes data with dual error correction coding in the C1 (vertical) sequence and in the C2 (diagonal) sequence. In CIRC4, the unit delay amount D is equal to four frames, and the maximum delay amount is 27D (=108 frames).

The data to be recorded in the subarea AR2 is supplied from the input terminal 55. The data from the input terminal 55 is supplied to a contact 57A of a switch circuit 57. The data generation circuit 56 generates data which can be decoded with both the CIRC4 and CIRC7 error correction codes. The output of the data generation circuit 56 is supplied to a contact 57B of the switch circuit 57. The switch circuit 57 is switched at a predetermined timing. The output of the switch circuit 57 is supplied to a CIRC7 error correction coding circuit 58.

The CIRC7 error correction coding circuit 58 encodes data with dual error correction coding in the C1 (vertical) sequence and in the C2 (diagonal) sequence. In CIRC7, the unit delay amount D is equal to seven frames, and the maximum delay amount is 27D (=189 frames).

When data is recorded in the subarea AR1 of the program area PA2, the content data encoded with CIRC4 error correction coding is supplied from the CIRC4 error correction coding circuit 54 to a subcode adding circuit 59.

When CIRC7 error correction coded data is recorded in the subarea AR2, data encoded with CIRC7 error correction coding is supplied from the CIRC7 error correction coding circuit 58 to the subcode adding circuit 59. The switch circuit 57 is switched at a predetermined timing, so that the data encoded with CIRC7 error correction coding can include data which can be decoded with both the CIRC 4 and CIRC7 error correction codes in predetermined pattern at predetermined position.

The subcode adding circuit 59 adds a subcode and a frame synchronization signal to one-frame data. The output of the subcode adding circuit 59 is supplied to a modulation circuit 60. The data to be recorded is EFM modulated in the modulation circuit 60.

The optical disc 1 is placed on a turntable (not shown), and is driven to rotate by a spindle motor 61. Under control of a servo control circuit 62, the spindle motor 61 is rotated by a spindle control circuit 63 at CLV (constant linear velocity) or CAV (constant angular velocity).

Based on a focus error signal and a tracking error signal, and based on an operational instruction from a system controller 68, the servo control circuit 62 generates various servo drive signals such as focus, tracking, sled, and spindle servo drive signals, and outputs these signals to a two-axis control circuit 64, a sled control circuit 65, and a spindle control circuit 63.

An optical pickup 66 traces a track concentrically or spirally formed in the optical disc 1, while focusing a light beam of a semiconductor laser used as a light source onto a signal surface of the optical disc 1. The optical pickup 66 includes an objective lens supported by a two-axis mechanism (not shown) in a movable manner in both the focus direction and the tracking direction for focusing the laser beam from the semiconductor laser onto the signal surface of the optical disc 1. The two-axis mechanism is controlled by the two-axis control circuit 64 under control of the servo control circuit 62. The sled mechanism 67 enables the optical pickup 66 to move in the radial direction of the optical disc 1. The movement of the sled mechanism 67 is controlled by the sled control circuit 65 under control of the servo control circuit 62.

The output data of the modulation circuit 60 is supplied to the optical pickup 66. A laser beam of which the output waveform is modulated according to the output data of the modulation circuit 60 is output from the optical pickup 66. The laser beam is irradiated onto the recording surface of the optical disc 1, thus allowing information to be recorded in the optical disc 1.

Figure 16:
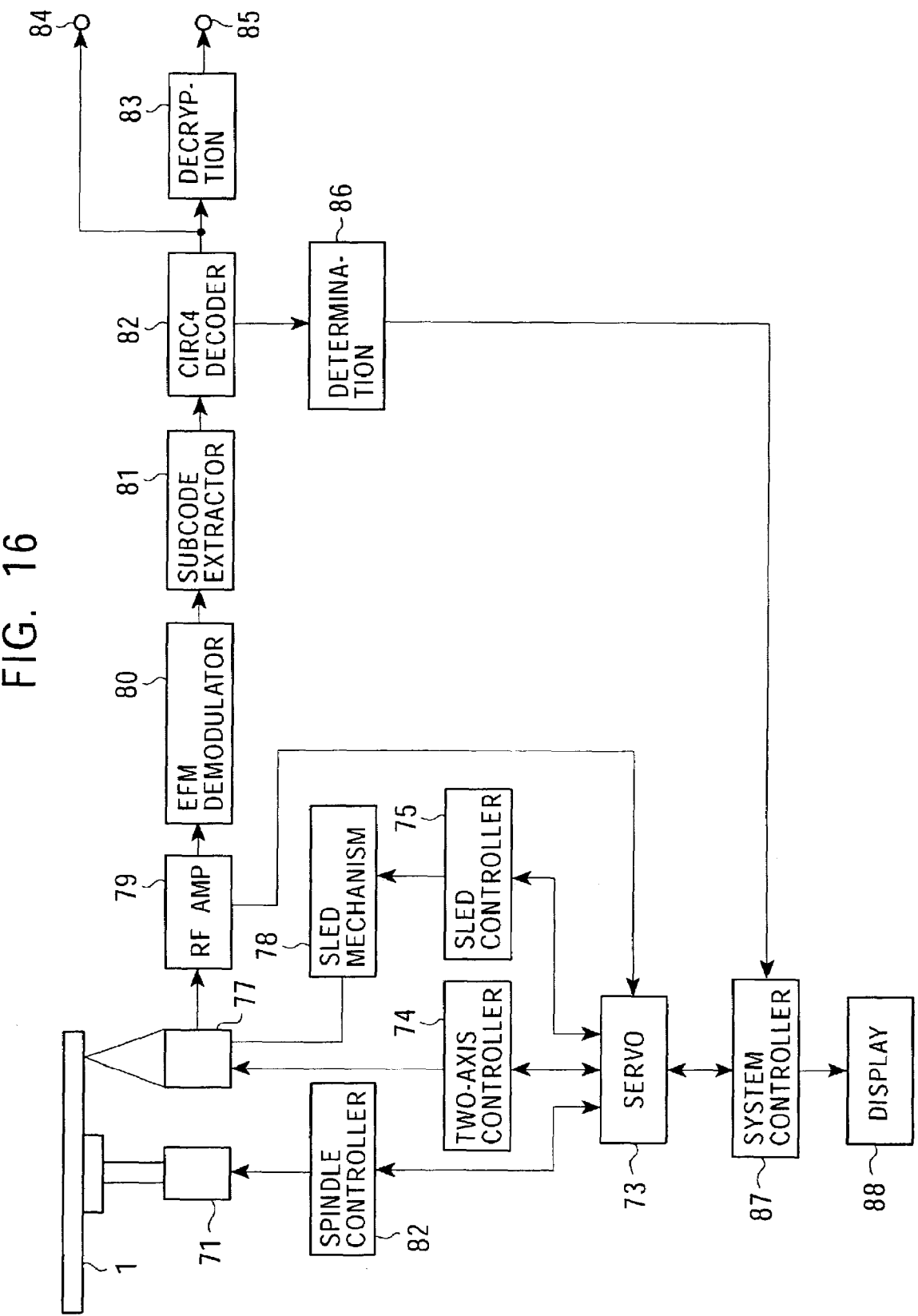
FIG. 16 is a block diagram of an optical disc playback apparatus according to the present invention.

FIG. 16 shows a playback apparatus. In FIG. 16, an optical disc 1 is placed on a turntable, and is driven to rotate by a spindle motor 71. Under control of a servo control circuit 73, the spindle motor 71 is rotated by a spindle control circuit 72 at CLV (constant linear velocity) or CAV (constant angular velocity).

Based on a focus error signal and a tracking error signal, and based on an operational instruction from a system controller 87, the servo control circuit 73 generates various servo drive signals such as focus, tracking, sled, and spindle servo drive signals, and outputs these signals to a two-axis control circuit 74, a sled control circuit 75, and a spindle control circuit 72. An optical pickup 77 traces a track concentrically or spirally formed in the optical disc 1, while focusing a light beam of a semiconductor laser used as a light source onto a signal surface of the optical disc 1. The sled mechanism 78 allows the optical pickup 77 to move in the radial direction of the optical disc 1.

The output signal of the optical pickup 77 is supplied to a demodulation circuit 80 via an RF amplifier 79. The output signal is EFM demodulated in the demodulation circuit 80. The output data of the demodulation circuit 80 is supplied to a subcode extracting circuit 81. The subcode extracting circuit 81 extracts subcode data. The output data of the subcode extracting circuit 81 is supplied to an error correction decoding circuit 82 for performing CIRC4 error correction.

When CD-DA data in the program area PA1 of the optical disc 1 is played back, the optical pickup 77 accesses the program area PA1 so that the data recorded in the program area PA1 is played back by the optical pickup 77. The playback output signal is supplied to the error correction decoding circuit 82 via the RF amplifier 79, the demodulation circuit 80, and the subcode extracting circuit 81.

The playback signal is CIRC4 error corrected in the error correction decoding circuit 82 to output audio data from the error correction decoding circuit 82. The audio data is then output from an output terminal 84.

When content data in the program area PA2 of the optical disc 1 is played back, the optical pickup 77 accesses the program area PA2 so that the data recorded in the program area PA2 is played back by the optical pickup 77. The playback output signal is supplied to the error correction decoding circuit 82 via the RF amplifier 79, the demodulation circuit 80, and the subcode extracting circuit 81.

The playback signal is CIRC4 error corrected in the error correction decoding circuit 82 to output from the error correction decoding circuit 82 audio data which is compressed using, for example, ATRAC3, as described above, and which is encrypted. The output data of the error correction decoding circuit 82 is supplied to a decryption circuit 83, and is decrypted in the decryption circuit 83. The output data of the decryption circuit 83 is output from an output terminal 85.

The subarea AR2 of the optical disc 1 contains data encoded with CIRC7 error correction coding, and the data includes data portions which can be decoded with both the CIRC4 and CIRC7 error correction codes in predetermined pattern at a predetermined position.

When it is determined whether the optical disc 1 is an original disc or a copied disc, the optical pickup 77 accesses the subarea AR2 of the optical disc 1, and the playback data of the subarea AR2 is supplied to the error correction decoding circuit 82. The playback data of the subarea AR2 is CIRC4 error corrected in the error correction decoding circuit 82, and the error-corrected data is supplied to a determination circuit 86.

The determination circuit 86 checks for uncorrectable error patterns. The output of the determination circuit 86 is passed to the system controller 87, and it is determined in the system controller 87 whether the optical disc 1 is an original disc or a copied disc. The result of determination is displayed on a display 88.

Figure 17:
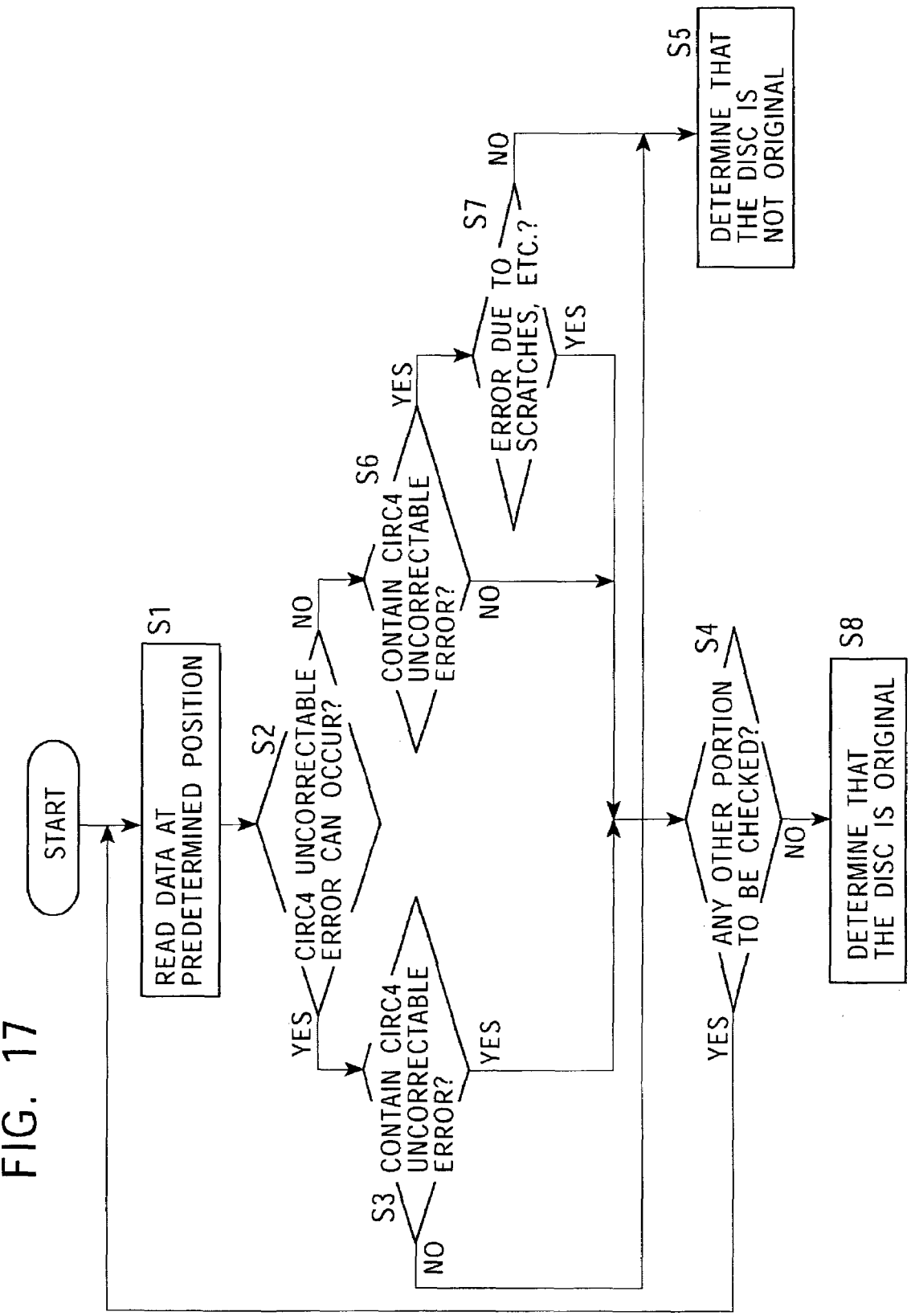
FIG. 17 is a flowchart for illustrating a process for determining whether or not a disc is original.

FIG. 17 is a flowchart showing a process for determining whether the optical disc 1 is an original disc or a copied disc. In FIG. 17, data at predetermined position of the optical disc 1, that is, data recorded in the subarea AR2 is read (step S1). The read data is subjected to error correction, and it is determined whether or not the resulting data can contain an uncorrectable error (step S2).

If it is determined in step S2 that the read data which is subjected to error correction can contain an uncorrectable error, it is determined whether or not an error uncorrectable with a CIRC4 error correction code occurs (step S3).

If it is determined in step S2 that the read data which is subjected to error correction can contain an uncorrectable error, and if it is determined in step S3 that an error uncorrectable with the CIRC4 error correction code occurs, it is determined whether or not there is any other portion to be checked (step S4). If any other portion to be checked still remains, the process returns to step S1.

If it is determined in step S2 that the read data which is subjected to error correction can contain an uncorrectable error, and if it is determined in step S3 that an error uncorrectable with the CIRC4 error correction code does not occur, it is determined that the optical disc 1 is not an original disc (step S5).

If it is determined in step S2 that the read data which is subjected to error correction cannot contain an uncorrectable error, that is, the read data can be decoded with both the CIRC4 and CIRC7 error correction codes, it is determined whether or not the CIRC4 error corrected data contains an uncorrectable error (step S6).

If it is determined in step S2 that the read data which is subjected to error correction cannot contain an uncorrectable error, and if it is determined in step S6 that an error uncorrectable with the CIRC4 error correction code does not occur, it is determined whether or not there is any other portion to be checked (step S4). If any other portion to be checked still remains, the process returns to step S1.

If it is determined in step S2 that the read data which is subjected to error correction cannot contain an uncorrectable error, and if it is determined in step S6 that an error uncorrectable with the CIRC4 error correction code occurs, it is determined whether or not the uncorrectable error can be caused by scratches or the like (step S7). If the uncorrectable error cannot be caused by scratches or the like, it is determined that the optical disc 1 is not an original disc (step S5). For example, if several hundred bytes of consecutive errors occur, it can be determined that the errors are caused by scratches or the like. If it is determined in step S7 that the uncorrectable error can be caused by scratches or the like, it is determined in step S4 whether or not there is any other portion to be checked.

If it is determined in step S4 that any other portion to be checked still remains, the process returns to step S1 to repeat the processing discussed above. If it is determined in step S4 that all the portions to be checked have been completely processed, it is determined that the optical disc 1 is an original disc (step S8). As a result, the playback operation of the optical disc 1 starts.

If it is determined that the optical disc 1 is not an original disc, this result may be displayed on the display 88 as an example. If the optical disc 1 is not an original disc, it may be suitable to prohibit a playback of the optical disc 1 installed in the playback apparatus. If the optical disc 1 is not an original disc, it may also be suitable to eject the optical disc 1 from the playback apparatus.

As discussed above, in an optical disc according to the present invention, the subarea AR2 contains data encoded with CIRC7 error correction coding, and the subarea AR2 also contains data portions which can be decoded with both the CIRC4 and CIRC7 error correction codes in predetermined pattern at predetermined position. With the structure of the optical disc, it can be determined whether or not the optical disc is original by comparing a result of CIRC4 error correction decoding with locations in which an error occurs and does not occur when the disc is an original disc.

In the foregoing description, the optical disc 1 shown in FIGS. 1 and 2 is a two-session disc which is divided into an inner circumference area and an outer circumference area, and one of the inner and outer circumference areas contains CD-DA data and the other contains compressed and encoded audio data. However, it is within the scope of the Invention that a one-session optical disc shown in FIG. 18 may also be used.

Figure 18:
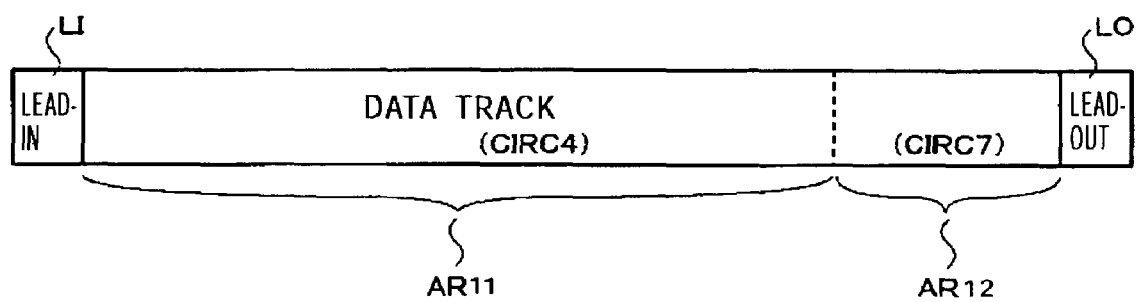
FIG. 18 is a schematic diagram of another structure of the optical disc according to the present invention.

The optical disc shown in FIG. 18 is formed of a lead-in area LI at the innermost circumference thereof, a program area PA surrounding the lead-in area LI, and a lead-out area LO surrounding the program area PA. The program area PA is divided into subareas AR11 and AR12. The subarea AR11 contains data encoded with CIRC4 error correction coding, and the subarea AR12 contains data encoded with CIRC7 error correction coding. The data recorded in the subarea AR12 includes data pattern which can be decoded with both the CIRC4 and CIRC7 error correction codes. With the structure of this type of disc, it can be determined from error pattern of the subarea AR12 whether the disc is an original disc or a copied disc.

In the foregoing description, the present invention has been discussed in the context of data which can be decoded with both the CIRC4 and CIRC7 error correction codes. However, CIRC encoded data having any interleave length can be decoded as far as the data is arranged so that predetermined data pattern based on the vertical (C1) sequence is repeated.

The data which can be decoded with a plurality of error correction coding schemes is not limited to CIRC encoded data, and may be further extended to data encoded with any other error correction coding applied in two sequences. Similarly to data encoded with CIRC coding, for example, data encoded with product coding applied in both the vertical direction and the horizontal direction can also be decoded with a plurality of coding schemes.

In the foregoing description, data encoded with CIRC7 error correction coding is recorded in the subarea AR2 of an optical disc, and the subarea AR2 also contains data pattern which can be decoded with both the CIRC7 and CIRC4 error correction codes, thereby determining whether the disc is an original disc or a copied disc. However, this pattern may be used to represent information.

For example, unique ID information may be added to a disc. The unique ID information added to a disc may be effective to manage production information or shipping state of that disc. The ID information may also be used to manage version updates. The ID information unique to each disc may be added, or the ID information unique to playback-only discs which are manufactured using a single stamper may be added.

When unique ID information is added to discs, it is essential to avoid the ID information of the discs from being copied.

Accordingly, data pattern which can be decoded with both the CIRC4 and CIRC7 error correction codes and which is included in CIRC7 encoded data recorded in the subarea AR2 may be used to represent the ID information of discs.

Specifically, in the subarea AR2, as shown in FIG. 12, the data portions BA1, BA2, BA3, etc., can be decoded with both the CIRC4 and CIRC7 error correction code, and the remaining data portions are encoded with CIRC7 error correction coding. When the data recorded in the subarea AR2 is CIRC4 error corrected during the playback process, no uncorrectable error occurs in the data portions BA1, BA2, BA3, etc., while an uncorrectable error occurs in the remaining data portions, as shown in FIG. 12.

Figure 19:
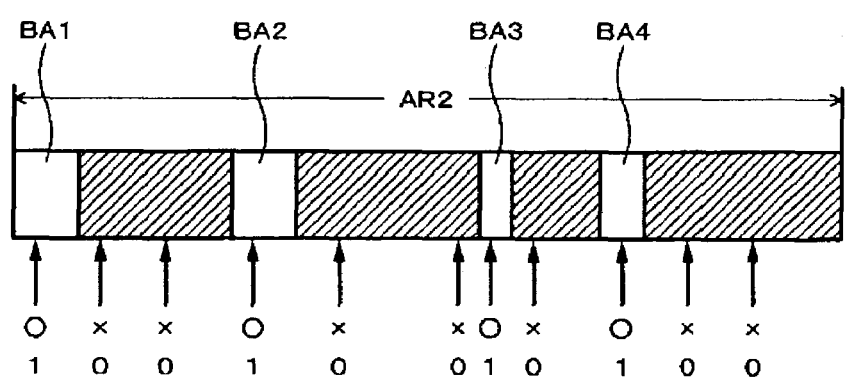
FIG. 19 is a schematic diagram of a modification of the optical disc of the present invention.

When certain information is represented using data pattern which can be decoded with both the CIRC7 and CIRC4 error correction codes and which is contained in CIRC7 encoded data recorded in the subarea AR2, for example, as in FIG. 19, a combination of information "1" which indicates the data portions BA1, BA2, BA3, etc., in which no error uncorrectable with CIRC4 coding occurs, and information "0" which indicates the remaining portions in which an error uncorrectable with CIRC 4 coding occurs is used. Of course, a portion in which no error uncorrectable with CIRC4 coding occurs may be indicated by information "0" and a portion in which an error uncorrectable with CIRC4 coding occurs may be indicated by information "1". A combination of information "1" and information "0" is used to represent certain information.

When data is CIRC error corrected during the playback process, the data portions BA1, BA2, BA3, etc., are designated by information "1" and the remaining portions are designated by information "0". Then, the information can be decoded.

As discussed above, data pattern which can be decoded with both the CIRC7 and CIRC4 error correction codes may be corrupted if copied. Thus, the information represented using the data pattern which can be decoded with both the CIRC7 and CIRC4 error correction codes is suitable to identify the disc, for example.

It is understood that the information represented using the data pattern which can be decoded with both the CIRC7 and CIRC4 error correction codes is not limited to ID information of discs. Such data pattern is suitable, in particular, for recording information which indicates "copy never".

In the foregoing description, the CIRC7 encoded data in the subarea AR2 includes data pattern which can be decoded with both the CIRC7 and CIRC4 error correction codes, which is used to represent certain information, and no error uncorrectable with CIRC4 coding occurs in a portion in which this data pattern is recorded. With use of the data pattern which can be decoded with both the CIRC7 and CIRC4 error correction codes, as discussed above, a portion in which no error uncorrectable with CIRC4 coding occurs can be easily formed in the CIRC7 encoded data.

Instead of data which can be decoded with both the CIRC7 and CIRC4 error correction codes, data encoded with CIRC7 error correction coding and data encoded with CIRC4 error correction coding may be recorded in predetermined pattern, which are used to represent certain information.

The illustrated embodiment has been described in the context of example in which original content data is recorded in a disc and this disc is copied. However, the present invention is not limited to this example, and may be applied to the case in which original content data is delivered over a computer network.

Specifically, music data downloaded over a network is encoded with CIRC4 error correction coding, and the encoded data includes error pattern uncorrectable with CIRC4 coding. The error pattern uncorrectable with CIRC4 coding may be implemented by providing an area containing CIRC7 encoded data, and by inserting data portions which can be decoded with both the CIRC4 and CIRC7 error correction codes into the CIRC7 encoded data in predetermined pattern, as discussed above. It is anticipated that this pattern may be used to represent certain information, as discussed above. In this case, the downloaded content data contains error pattern uncorrectable with CIRC4 coding, and the error pattern uncorrectable with CIRC4 coding is corrupted when the data is copied. As a result, it can be determined whether or not the received music data is original data.

In the above-described optical disc 1, the subarea AR2 contains data encoded with CIRC7 error correction coding, and the CIRC7 encoded data includes a data portion which can be decoded with both the CIRC4 and CIRC7 error correction codes. When this data portion is played back as a sound without intention, noise may be caused. Therefore, it is conceivable that a PCM (pulse code modulated) signal in which the upper bits are set to "0" or "1" be embedded in this data portion to reduce noise.

If a sound reproduced from this data portion is a DC sound or a high-frequency sound, users are insensitive to the sound, and may turn up the volume. Accordingly, data "0" and data "1" may be embedded in specific pattern to reproduce an audible-range sound. As an example, "0" and "1" are repeated every 7.35 kHz.

Some CIRC decoding circuits do not perform C2 error correction until an error of the C1 sequence occurs. For supporting a drive or player having such a decoding circuit, it is conceivable that a data portion which is recorded in the subarea AR2 of a disc and which can be decoded with both the CIRC4 anc CIRC7 error correction codes contain an error of the C1 of sequence.

What is claimed is:

1. A recording medium including an area in which data encoded with a first error correction code is recorded,
    wherein said data includes erroneous uncorrectable data including an uncorrectable error not correctable by the first error correction code, and erroneous correctable data without an uncorrectable error not correctable by the first error correction code, and said data is recorded in a predetermined pattern in the recording medium.

2. A recording medium according to claim 1, wherein the erroneous uncorrectable data is data encoded with a second error correction code different from the first error correction code.

3. A recording medium according to claim 2, wherein the erroneous correctable data can be decoded with both the first error correction code and the second error correction code.

4. A recording medium according to claim 3, wherein each of the first error correction code and the second error correction code is applied in at least a two-direction code sequence, the first error correction code and the second error correction code being different only in view of the code sequences; and the erroneous correctable data is arranged such that the predetermined data pattern based on one of the two-direction code sequences is repeated.

5. A recording medium according to claim 3, wherein each of the first error correction code and the second error correction code is applied in a vertical C1 sequence and a diagonal C2 sequence, the first error correction code and the second error correction code having different interleave lengths; and the erroneous correctable data is constructed so that predetermined data pattern based on the C1 sequence is repeated.

6. A recording medium according to claim 5, wherein the erroneous correctable data includes an error of the C1 sequence.

7. A recording medium according to claim 1, wherein, in a data portion in which the erroneous uncorrectable data and the erroneous correctable data are recorded in the predetermined pattern, upper bits are set to the same value.

8. A recording medium according to claim 1, wherein a data portions in which the erroneous uncorrectable data and the erroneous correctable data are recorded in the predetermined patterns is played back as an audible-range sound.

9. A recording medium according to claim 8, wherein, in the data portion in which the erroneous uncorrectable data and the erroneous correctable data are recorded in the predetermined pattern, data "zero" and data "one" are repeated in a predetermined period.

10. A recording medium according to claim 1, wherein a data portion in which the erroneous uncorrectable data and the erroneous correctable data are recorded in the predetermined pattern is used to identify the recording medium.

11. A recording medium according to claim 1, wherein a data portion in which the erroneous uncorrectable data and the erroneous correctable data are recorded in the predetermined pattern is used to determine whether or not the recording medium is original.

12. A recording method comprising:
recording data encoded with a first error correction code in a recording area of a recording medium; and
recording erroneous uncorrectable data, including an uncorrectable error which cannot be corrected with the first error correction code and erroneous correctable data which does not include an uncorrectable error which cannot be corrected with the first error correction code in a predetermined pattern, at a predetermined position of the recording medium.

13. A recording method according to claim 12, wherein the first erroneous uncorrectable data is data encoded with a second error correction code different from the first error correction code.

14. A recording method according to claim 13, wherein the erroneous correctable data can be decoded with both the first error correction code and the second error correction code.

15. A recording method according to claim 14, wherein each of the error correction code and the second error correction code is applied in at least two-direction code sequences, the first error correction code and the second error correction code being different only in view of the code sequences; and the erroneous correctable data is arranged such that the predetermined data pattern based on one of the two-direction code sequences is repeated.

16. A recording method according to claim 14, wherein each of the first error correction code and the second error correction code is applied in a vertical C1 sequence and a diagonal C2 sequence, the first error correction code and the second error correction code having different interleave lengths; and the erroneous correctable data is arranged such that the predetermined data pattern based on the C1 sequence is repeated.

17. A recording method according to claim 16, wherein the erroneous correctable data includes an error of the C1 sequence.

18. A recording method according to claim 12, wherein, in a data portion in which the erroneous uncorrectable data and the erroneous correctable data are recorded in the predetermined pattern, upper bits are set to the same value.

19. A recording method according to claim 12, wherein data which is played back as an audible-range sound is recorded so that the erroneous uncorrectable data and the erroneous correctable data are recorded in the predetermined pattern.

20. A recording method according to claim 19, wherein data "zero" and data "one" which are repeated in a predetermined period are recorded so that the erroneous uncorrectable data and the erroneous correctable data are recorded in the predetermined pattern.

21. A recording apparatus of a recording medium, comprising:
a recording unit configured to record data in the recording medium;
an error correction coding unit configured to encode input data with a first error correction code;
a modulation unit configured to modulate the output data of the error correction coding unit to output the modulated data to the recording unit; and
a data generation unit configured to generate data which can be decoded with both the first error correction code and a second error correction code different from the first error correction code, and configured to supply the generated data to the error correction coding unit.

22. A recording apparatus according to claim 21, wherein data based on the output data of the error correction coding unit obtained by encoding the input data supplied to the error correction coding unit, and data based on the output data of the error correction coding unit obtained by encoding the data supplied from the data generation unit to the error correction coding unit are recorded in a predetermined pattern in the recording medium.

23. A recording apparatus according to claim 21, wherein each of the first error correction code and the second error correction code is applied in at least two-direction code sequences, and the first error correction code and the second error correction code are different only in view of the code sequences.

24. A recording apparatus according to claim 21, wherein each of the first error correction code and the second error correction code is applied in a vertical C1 sequence and a diagonal C2 sequence, and the first error correction code and the second error correction code have different interleave lengths.

25. A playback apparatus of a recording medium, comprising:
a head configured to read data recorded in the recording medium;
a demodulation unit configured to demodulate the output signal of the head;
an error correction unit configured to perform error correction on the output data of the demodulation unit using an error correction code; and
a determination unit configured to determine whether the recorded medium is an original recording medium, based on whether or not an error pattern uncorrectable with the error correction code as a result of the error correction performed by the error correction unit is a predetermined pattern.

26. A playback apparatus according to claim 25, wherein the determination unit is configured to determine whether the recording medium is the original recording medium when the uncorrectable error pattern is the predetermined pattern.

27. A playback apparatus according to claim 25, wherein the determination unit is configured to determine whether the recording medium is not the original recording medium when the uncorrectable error pattern is not the predetermined pattern, and the playback apparatus terminates a playback of the recording medium.

28. A playback apparatus according to claim 25, wherein data which includes an error uncorrectable with the error correction code, and data which does not include an error uncorrectable with the error correction code are recorded in predetermined pattern at a predetermined position of the recording medium; and the determination unit is configured to determine whether the recording medium is the original recording medium based on whether or not the data read from the predetermined position of the recording medium by the head is data obtained as a result of the error correction performed by the error correction unit.

29. A playback apparatus according to claim 28, wherein the determination unit is configured to determine whether or not the recording medium is the original recording medium based on whether or not the result of the error correction performed by the error correction unit is the predetermined result.

30. A playback method of a recording medium, comprising:

reading data recorded in the recording medium;
demodulating the read data;
performing error correction on the demodulated data with an error correction code; and
determining whether the recorded medium is an original recording medium based on whether or not error pattern uncorrectable with the error correction code as a result of the error correction is a predetermined pattern.

31. A playback method according to claim 30, wherein it is determined that the recording medium is the original recording medium when the uncorrectable error pattern is the predetermined pattern.

32. A playback method according to claim 31, wherein, when it is determined that the recording medium is the original recording medium, a playback of the recording medium starts.

33. A playback method according to claim 30, wherein it is determined that the recording medium is not the original recording medium when the uncorrectable error pattern is not the predetermined pattern, and a playback of the recording medium terminates.

34. A playback method according to claim 30, wherein data which includes an error uncorrectable with the error correction code, and data which does not include an error uncorrectable with the error correction code are recorded in predetermined pattern at predetermined position of in the recording medium; and the recording medium is determined based on whether or not the data read from the predetermined position of the recording medium is data obtained as a result of the error correction.

35. A playback method according to claim 34, wherein it is determined whether or not the recording medium is the original recording medium based on whether or not the result of the error correction is the predetermined result.

36. A data determination method comprising:

performing error correction on transmitted data using an error correction code; and
determining whether or not the transmitted data is original data based on whether or not an error pattern uncorrectable with the error correction code is a predetermined pattern.

37. A data determination method according to claim 36, wherein it is determined that the transmitted data is original data when the uncorrectable error pattern is the predetermined pattern.

38. A data determination method according to claim 36, wherein it is determined that the transmitted data is not original data when the uncorrectable error pattern is not the predetermined pattern.

* * * * *

UNITED STATES PATENT AND TRADEMARK OFFICE
CERTIFICATE OF CORRECTION

| | | |
|---|---|---|
| PATENT NO. | : 7,039,848 B2 | Page 1 of 1 |
| APPLICATION NO. | : 10/319679 | |
| DATED | : May 2, 2006 | |
| INVENTOR(S) | : Tatsuya Inokuchi et al. | |

It is certified that error appears in the above-identified patent and that said Letters Patent is hereby corrected as shown below:

Column 17, line 2, Claim #8, change "portions" to --portion--.

Column 17, line 4, Claim #8, change "patterns" to --pattern--.

Column 17, line 38, Claim #15, after "of the" insert --first--.

Signed and Sealed this

Nineteenth Day of December, 2006

JON W. DUDAS
*Director of the United States Patent and Trademark Office*